June 19, 1962 D. N. MEYERS 3,039,746
AUTOMATIC RESETTING CARGO HOOK
Filed June 24, 1960 3 Sheets-Sheet 1

INVENTOR
*Donald N. Meyers*

BY *Mason, Fenwick & Lawrence*
ATTORNEYS

June 19, 1962

D. N. MEYERS 3,039,746

AUTOMATIC RESETTING CARGO HOOK

Filed June 24, 1960

INVENTOR
Donald N. Meyers

BY Mason, Fenwick & Lawrence
ATTORNEYS

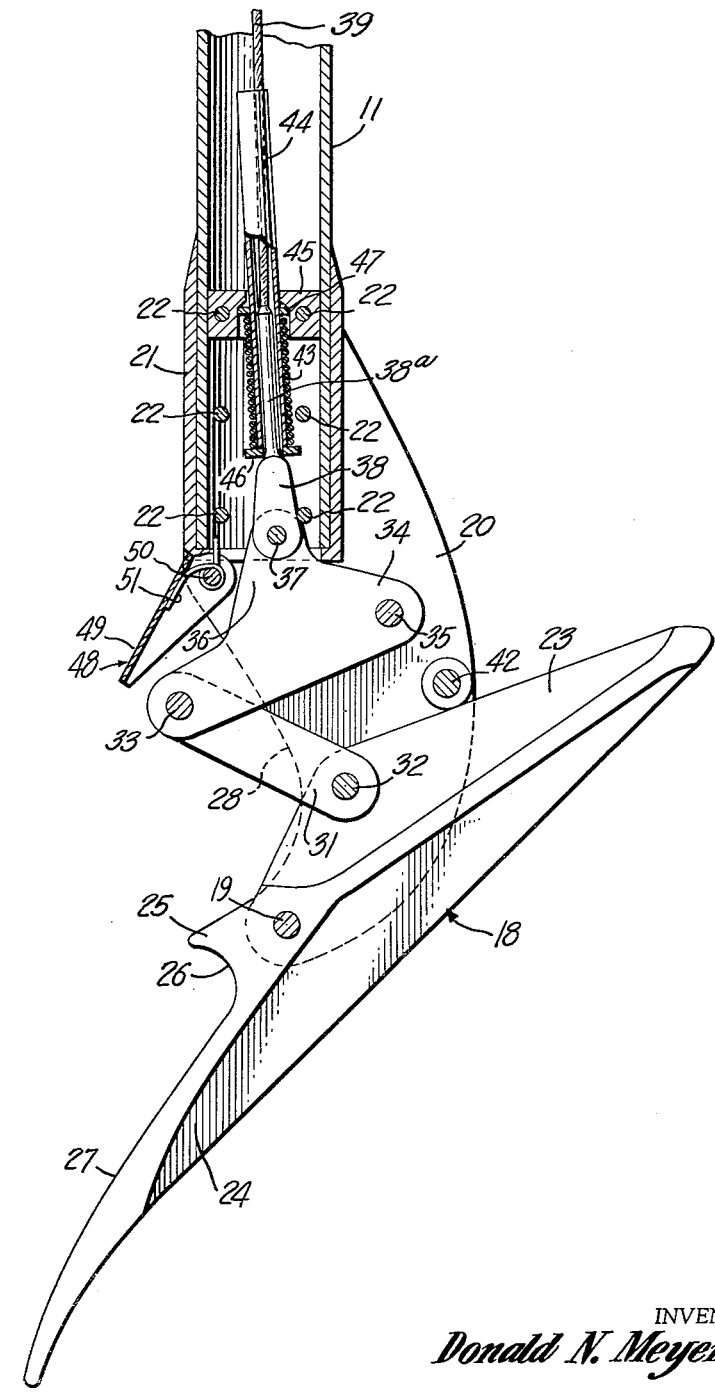

United States Patent Office 3,039,746
Patented June 19, 1962

3,039,746
AUTOMATIC RESETTING CARGO HOOK
Donald N. Meyers, 5918 Devon Place, Philadelphia, Pa.
Filed June 24, 1960, Ser. No. 38,530
3 Claims. (Cl. 258—1.2)

The present invention relates in general to cargo hooks, and more particularly to automatic resetting cargo hooks for aircraft, particularly helicopter type aircraft, adapted especially for aircraft cargo pickup systems.

An object of the present invention is the provision of a novel cargo pickup system providing the ability to engage loads from a helicopter without ground personnel to make the connection with the load or any other personnel to guide the pilot for purposes of making contact.

Another object of the present invention is the provision of a novel cargo hook especially adapted to be carried on a boom suspended from a helicopter or other airborne craft to readily pick up cargo by entering a suitable bail, loop or hook-on ring attached to the load to be lifted.

Another object of the present invention is the provision of a novel cargo hook of the character pointed out in the preceding paragraph, wherein the hook may be readily released to an open position to release the load by a simple, reliable toggle mechanism which can be tripped from a remote location.

A further object of the present invention is the provision of a cargo hook of the character pointed out in the immediately preceding paragraph, wherein an automatic resetting or relocking mechanism is provided to return the hook to closed position upon release of the load.

Other objects, advantages and capabilities of the present invention will become apparent from the following detail description, taken in conjunction with the accompanying drawings illustrating a preferred embodiment of the invention.

In the drawings:

FIGURE 3 is a section view similar to FIGURE 2 showing the components in the position occupied when the assembly is in open condition.

Figure 1:
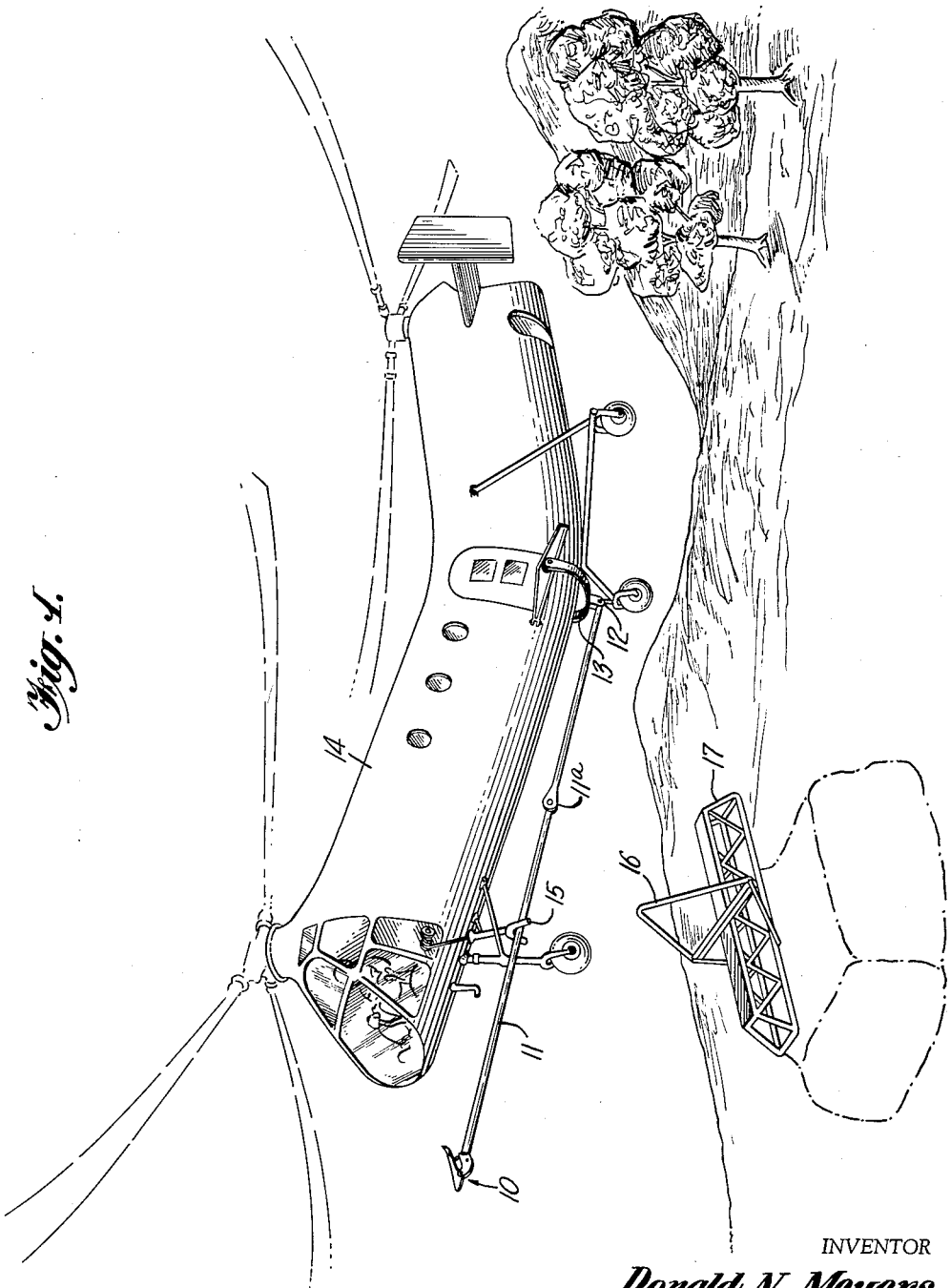
FIGURE 1 is a perspective view of a cargo hook and boom assembly embodying the present invention mounted on a helicopter in stowed position preparatory to pickup of a load, illustrating an arrangement of the parts in an exemplary cargo pickup system.

Referring to the drawings wherein like reference characters designate corresponding parts throughout the several figures, the cargo hook assembly of the present invention, indicated generally by the reference character 10 is a generally spear-shaped unit having a generally hook-shaped configuration adapted to be disposed on the outer end of an elongated tubular boom 11, the inner end of which is suitably pivoted to a helicopter or other airborne aircraft, as illustrated in FIGURE 1, preferably by means of a fitting 12 which slides along a curved track 13 fixed to the helicopter fuselage 14. The boom 11 is preferably provided with a hinge joint 11a near its midpoint, so that when the load is deposited upon the ground, the boom will buckle, and thereby prevent damage to the cargo or the helicopter from inadvertent compressive loads in the boom. The load boom 11, in the stowed position, may rest just below the belly of the helicopter, positioned by the cradle 15 located near the pilot's compartment of the helicopter, preferably with the cargo hook assembly 10 disposed somewhat forward and to one side of the pilot. In use, the boom is designed to hang vertically below the helicopter after pick up, suspending the load beneath the helicopter at the proper location for longtudinal trim, suitable cable means extending to the pilot's compartment being provided, for example, to permit the boom to be drawn up to the stowed position when not in use.

The cargo hook assembly 10 is designed so that it will easily enter a large hook-on ring or bail 16 which will have been attached to the load to be lifted. For example, the hook-on bail 16 may be directly secured to the load by any suitable fastening means, or may be rigidly secured to a cargo spreader beam 17 of the type illustrated in FIGURE 1, consisting of a light weight trusswork beam for example of triangular cross section with slidable rubber snubbing pads adapted to be adjusted to lie firmly on top of cargo of a wide variety of shapes, and having tie tapes depending from the beam which may be lashed about the cargo to securely fasten the cargo to the beam 17.

Figure 2:
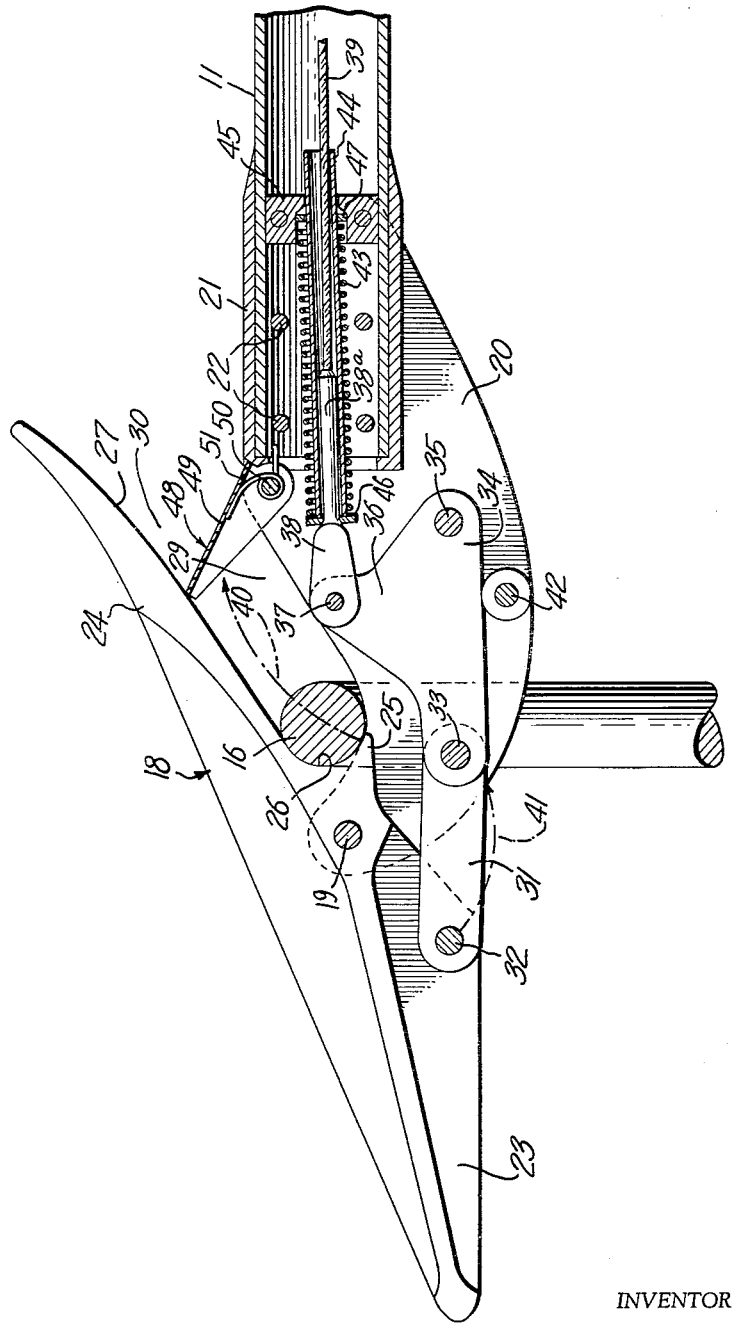
FIGURE 2 is a longitudinal section view of the cargo hook assembly illustrating the positions of the components when the assembly is in closed condition.

The cargo hook assembly 10, the construction of which is illustrated more clearly in FIGURES 2 and 3, comprises a pivoted element 18 connected by a suitable pivot 19 to an arcuate mounting plate 20, or a laterally spaced pair of such mounting plates, rigidly fixed at the inner end thereof to the tubular boom 11, as for example by a suitable fitting mounted on the end of the tubular boom 11 and through bolts or pins 22 extending through the boom. It will be understood, of course, that any suitable means capable of sustaining the loads to be borne by the hook assembly 10 may be employed to secure the mounting plate 20 to the boom 11. The mounting plate 20 forms the shank portion of the hook configuration developed by the hook assembly 10 and extends generally along the projected axis of the boom 11 along an arc lying below the boom axis as viewed in FIGURE 2 to a position spaced from the end of the boom and proximate to the projected boom axis, the hook pivot 19 being disposed slightly below the projected axis of the boom as viewed in FIGURE 2.

The pivoted element 18 is of a distorted generally triangular configuration having a spear-shaped leading portion 23 projecting beyond the pivot 19 relative to the boom to facilitate entry of the hook assembly into the large bail or hook-on ring 16 attached to the cargo to be lifted. The remaining portion of the pivoted element 18 extending from the pivot 19 inwardly toward the boom 11, which portion is designated generally by the reference character 24, forms the bill or lip of the working hook and includes an inwardly projecting extension 25 bounded by a concavely curved wall 26 forming the bail-engaging or saddle portion of the working hook when the hook assembly is in the closed position illustrated in FIGURE 2 and which joins smoothly with the curved inner wall 27 of the bill forming portion 24 and with the outer wall 28 of the mounting plate 20 to form a smoothly curved bounding surface for the bail-receiving recess 29 into which the bail 16 is received through the throat portion 30 thereof.

A toggle link 31 is pivoted at its outer end as indicated at 32 to the spear-shaped leading portion 23 of the hook element 18 at a point below and outwardly of the pivot 19, and is pivotally coupled at its inner end as indicated at 33 to a generally triangular or bell-crank shaped toggle arm 34 mounted by a fixed pivot pin 35 onto the mounting plate 20. It will be noted from FIGURE 2 that the pivot pins 32 and 35 are aligned along a rectilinear axis parallel to the projected axis of the boom 11 when the hook assembly is in the closed position and the pin 33 is slightly over-center or below the axis connecting the pins 32 and 35 as viewed in FIGURE 2 to resist accidental opening of the hook assembly. The toggle arm 34 includes an extension 36 extending to a position close to the projected axis of the boom 11 and secured by a coupling pin 37 to a clevis or other suitable fixture 38 secured to a release cable 39 which extends coaxially through the boom 11 to a suitable location in the helicopter or other airborne craft from which the boom is suspended. It will be understood that upon movement of the cable 39 inwardly of the boom 11 or to the right as viewed in FIGURE 2, the toggle arm 34 will be rotated in a clockwise direction from the position illustrated in FIGURE 2 through the inter-connection of the clevis 38 with the extension 36 of the toggle arm 34, and that such clockwise movement of the toggle arm 34 will cause the pivot pin 33 to be drawn upwardly in a clockwise direction through the arcuate path indicated by the arrow 40, thus drawing the pivot pin 32 through a counterclockwise arcuate path indicated by the arrow 41 and shifting the element 18 in a counterclockwise direction to the fully open position illustrated in FIGURE 3. A stop 42 is fixed to the mounting plate 20 at a position to be engaged by an edge of the spear-shaped leading portion 23 and define the open limit position thereof. This stop 42 is also engaged by the toggle arm 34 when the hook is in the closed position to orient the arm 34 so that the pivot pins 32 and 35 are in alignment with each other, with the pin 33 in its over-center position below the axis interconnecting the pins 32 and 35. The consequent movement of the saddle forming portion 26 and the bill forming portion 24 of the element 18 causes the hook assembly to then present a steep, downwardly inclined surface to the bail 16 to cause the bail to readily slide off of the hook assembly and be released therefrom. It will be appreciated, of course, that the toggle arm 34 and hook element 18 may be activated to shift the hook assembly to open condition by either a pull on the mechanical release cable 39 or by other suitable and well-known electrical or hydraulic remote control mechanisms to effect the necessary counterclockwise or opening movement of the toggle arm 34.

A spring return mechanism is provided to cause the hook assembly to reset or recock after tripping and releasing of the load, the spring release assembly in the preferred embodiment herein described comprising a coil spring 43 surrounding a suitable guide tube 44 slidably supported for axial and tilting movement within a partition 45 in the tubular boom 11 and surrounding the release cable 39 and the inner tubular stem 38a of the clevis fitting 38, the spring 43 bearing at its outer end on a suitable washer or bearing disk 46 fitted over the stem 38a of the clevis 38 to move inwardly therewith upon traction on the release cable 39 to compress the spring 43 against the stop ring 47 fixed in the partition 45 within the boom 11. Consequently, upon release of the cable 39, the spring 43 will immediately project the clevis 38 outwardly of the boom 11 to return the toggle arm 34 in a counterclockwise direction to its hook closing position illustrated in FIGURE 2.

The hook assembly 10 also includes a spring-loaded keeper 48 in the form of a pivoted lever 49 secured to the mounting plate 20 for movement about a pivot pin 50 and resiliently biased to a guard or throat-closing position as illustrated in FIGURE 2 by a torsion spring 51, the lever 49 being of suitable length to substantially span throat 30 of the bail-receiving recess 29.

It will be apparent, therefore, that a simple, reliably acting, cargo hook assembly is thus provided wherein, due to the spear-shaped leading portion extending in advance of the bight or saddle of the working hook portion, the hook assembly can be readily guided through the bail or pickup ring attached to the load. Because of the positioning of the pivot pins 32, 33 and 35 of the toggle mechanism, the components of the toggle mechanism are arranged in such a way as to effectively resist accidental opening of the working hook due to the forces imposed by the load. The tilting of the pivoted element 18 about the pin 19, upon actuation of the toggle mechanism, effects a shifting of the saddle portion of the working hook downwardly and outwardly about the pivot 19 and presents to the bail or ring a steeply declining surface formed by the bill or lip portion of the hook to insure complete release of the load from the hook.

While but one specific embodiment of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A cargo hook assembly adapted to be secured to an elongated boom carried by an aircraft for use in aircraft cargo pickup systems and the like wherein the cargo has a large pickup bale secured thereto, comprising a mounting member to be secured to the free end of the boom having an extension projecting beyond said free end generally along the projected axis of the boom, an elongated bill member coacting with the extension of said mounting member to form a working hook, means pivotally connecting said bill member at an intermediate location along the same to the mounting member extension remote from the end of the boom for movement between a first load-carrying position and a second load-releasing position, said bill member having first and second end portions extending oppositely from the pivotal connection with said mounting member extension, said first end portion extending from the pivotal connection in a direction toward the boom in transversely spaced relation adjacent to said mounting member extension when the bill member occupies said first load-carrying position to define with said mounting member an upwardly opening hook recess, said first end portion having a continuous surface disposed adjacent said mounting member in said first load-carrying position forming a concave bail seat and a bail guide surface to provide respectively a base and side of said hook recess, the second end portion of said bill member having a tapering configuration extending from the pivotal connection in a direction away from the boom in said first load-carrying position to form a leading portion of the hook assembly to be threaded through the pickup bale, and means for swinging said bill member about its pivotal connection from said first load-carrying position to said second load-releasing position through an angle disposing said concave bail seat of said first end portion in a generally downwardly facing direction with said bail guide surface extending in a steeply downwardly declining path from said concave bail seat when the boom is arranged on a generally vertical axis to facilitate gravitational release of a bail from the hook assembly.

2. A cargo hook assembly adapted to be secured to an elongated boom carried by an aircraft for use in aircraft cargo pickup systems and the like wherein the cargo has a large pickup bail secured thereto, comprising a mounting plate to be secured to the free end of the boom projecting as an extension thereof generally along the projected axis of the boom and having a mounting end to be disposed adjacent the boom and a remote end spaced outwardly therefrom, an elongated pivoted bill member coacting with said mounting plate to form a working hook, means pivotally connecting said bill member adjacent its center to the mounting plate near the remote end of the latter for movement between a first load-carrying position and a second load-releasing position, said bill member having first and second end portions extending oppositely from the pivotal connection with said mounting plate, said first end portion being configured to form a bill portion of the working hook extending from the pivotal connection in a direction toward the boom and in spaced relation adjacent to said mounting plate when said bill member occupies said first load-carrying position to define with said mounting member an upwardly opening hook recess, said first end portion and said mounting plate having adjacent edges forming sides of said hook recess and said first end portion including a saddle-forming projection disposed closely adjacent to the pivotal connection with said mounting plate joining said adjacent edge of said first end portion providing a concave seat at the base of said hook recess for the pickup bail, the second end portion of said bill member having a spear-shaped configuration extending from the pivotal connection in a direction away from the boom to form a leading portion of the hook assembly to be threaded through the pickup bail, and means responsive to a remote actuating device and intercoupled with said bill member for swinging said bill member about its pivotal connection from said first load-carrying position to said second load-releasing position through an angle disposing said concave seat of said saddle-forming projection in a generally downwardly facing relation and said adjacent edge of said first end portion in a steeply downwardly declining path when the boom is arranged on a generally vertical axis to facilitate gravitational release of the bail from the hook assembly.

3. A cargo hook assembly adapted to be secured to an elongated boom carried by an aircraft for use in aircraft cargo pickup systems and the like wherein the cargo has a large pickup bail secured thereto, comprising a mounting plate to be secured to the free end of the boom projecting as an extension thereof generally along the projected axis of the boom and having a mounting end to be disposed adjacent the boom and a remote end spaced outwardly therefrom, an elongated pivoted bill member coacting with said mounting plate to form a working hook, means pivotally connecting said bill member adjacent its center to the mounting plate near the remote end of the latter for movement between a first load-carrying position and a second load-releasing position, said bill member having first and second end portions extending oppositely from the pivotal connection with said mounting plate, said first end portion being configurated to form a bill portion of the working hook extending from the pivotal connection in a direction toward the boom and in spaced relation adjacent to said mounting plate when said bill member occupies said first load-carrying position to define with said mounting member an upwardly opening hook recess, said first end portion and said mounting plate having adjacent edges forming sides of said hook recess and said first end portion including a saddle-forming projection disposed closely adjacent to the pivotal connection with said mounting plate joining said adjacent edge of said first end portion providing a concave seat at the base of said hook recess for the pickup bail, the second end portion of said bill member having a spear-shaped configuration extending from the pivotal connection in a direction away from the boom to form a leading portion of the hook assembly to be threaded through the pickup bail, a toggle member pivotally mounted on said mounting plate having a connection at one eccentric point thereon to a remote actuating clevis and a link coupled between another eccentric point on said toggle member and an eccentric point on said bill member for swinging said bill member about its pivotal connection between said first load-carrying position and said second load-releasing position through an angle causing said concave seat to face generally downwardly and dispose said adjacent edge of said first end portion to present a steeply declining surface to a bail resting against said concave seat when the boom is arranged on a generally vertical axis to insure release of the bail from said hook assembly, the points of interconnection of said link with said bill member and the pivotal axis of said toggle member being disposed along a rectilinear axis paralleling the projected axis of the boom when the hook assembly is in said first load-carrying position, and the pivotal connection of said link with said toggle member being positioned to be shifted through said rectilinear axis to a slightly over-center position on movement of said bill member from said second position to said first load-carrying position.

References Cited in the file of this patent

UNITED STATES PATENTS

| | | |
|---|---|---|
| 2,319,881 | Ray | May 25, 1943 |
| 2,341,324 | Ingres | Feb. 8, 1944 |
| 2,373,414 | Plummer | Apr. 10, 1945 |
| 2,402,574 | Plummer | June 25, 1946 |
| 2,433,473 | Mitchell | Dec. 30, 1947 |